Figure 1:
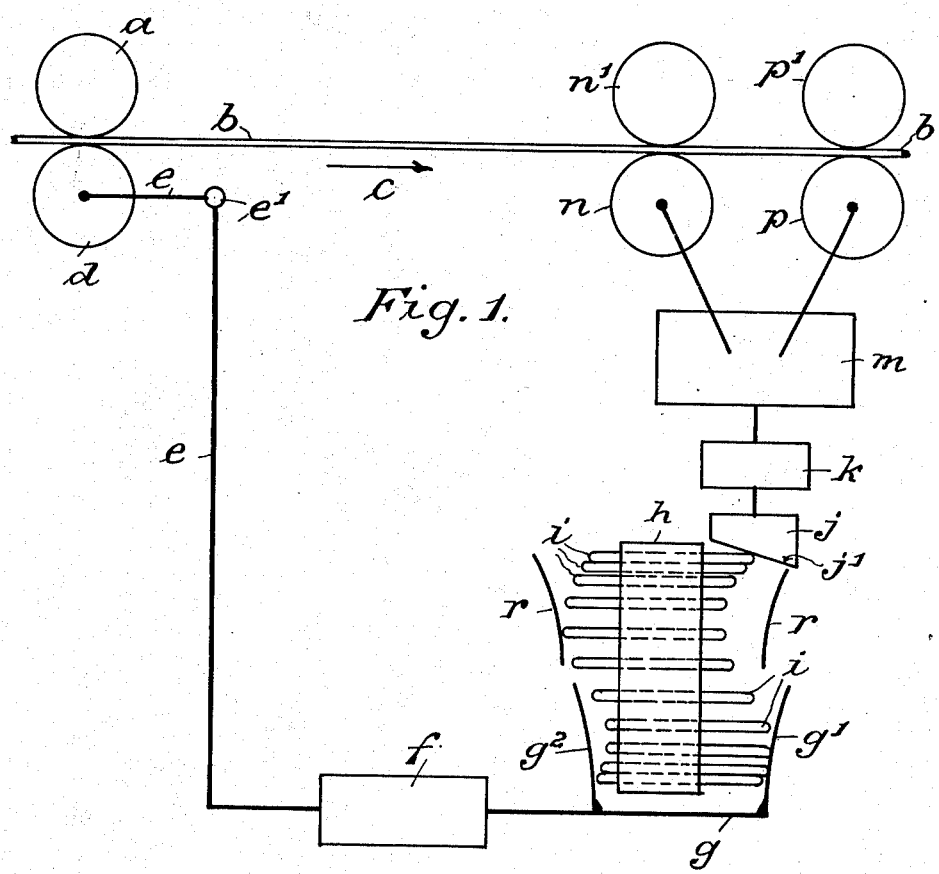

June 22, 1954  G. F. RAPER  2,681,475
DEVICE FOR CONTROLLING UNIFORMITY OF MATERIALS
Filed May 7, 1948

Inventor
George Frederick Raper

Patented June 22, 1954

2,681,475

UNITED STATES PATENT OFFICE 2,681,475

DEVICE FOR CONTROLLING UNIFORMITY OF MATERIALS

George Frederick Raper, Lothersdale, near Keighley, England

Application May 7, 1948, Serial No. 25,724

7 Claims. (Cl. 19—70)

The invention is characterized in that the sliver concerned is passed through a detecting device comprising a cooperating rotating wheel and a relatively narrow groove, such cooperating wheel and groove being of such a character that any departure from standard effects relative movement of separation of the parts in a direction perpendicular to the base of the groove, and in that means are provided whereby such movement of separation is rendered effective to vary continuously and automatically means for drafting the sliver in such a manner as to correct any departure from standard in the thickness or direction of the sliver.

As above described the means according to the invention will deal with departures from standard occurring or extending over relatively long lengths of sliver. To deal with short-length variations I may provide, between the feeler mechanism and the variable speed mechanism or the other means by which the drafting action is regulated or varied, what I term a controlling relay, the construction and operation of which I shall describe later.

The movements of the feeler member may be suitably magnified by any convenient means and transmitted either directly, or through the controlling relay, to the variable speed mechanism or other means by which the drafting action is to be varied.

The controlling relay, as I term it, comprises means for receiving the indications of the feeler mechanism, measuring them as to amplitude and/or rate of change of amplitude, and/or direction of amplitude, and then modifying them by inserting either a predetermined delay between receipt and transmission of an indication or a delay determined by the amplitude or the rate or the direction of change in amplitude, or by increasing or decreasing the amplitude of the transmitted indications either by a predetermined amount or by an amount controlled by the amplitude or the rate of change of amplitude of the indications.

A practical embodiment of a controlling relay may comprise a rotating wheel or an endless chain carrying a series of axially-movable rods the tips of which are successively caused to project beyond the periphery of the wheel or the surface of the chain by an amount proportional to the thickness or diameter of the sliver measured by the feeler mechanism at that moment. Thus as the wheel revolves, or the chain is traversed, the ends of the rods present a wave-like profile corresponding or proportional to the thickness profile of the sliver, but which may be caused to differ from the latter in wave-length by varying the peripheral speed of the wheel or the rate of traverse of the chain relative to the speed of travel of the sliver, and it may also be caused to differ in amplitude by making provision for appropriate magnification of the feeler indications.

The wheel or chain may move at a fixed speed or a speed variable in any desired manner to modify wavelength or time lag.

The indications of the feeler, as translated into setting of the movable rods, are applied to a "transmitter" designating a device adapted to feel the extent of projection of the rods in the wheel or chain and transmit this, in any desired degree of magnification, to the means by which the drafting action is controlled or varied. A transmitter may comprise a series of knives or equivalent members arranged side by side and capable of moving either in a plane at right angles to the axis of the setter wheel or to the direction of travel of the chain, or at any such other angle as may be convenient. The knives or equivalent members, which may be of equal or varying widths, are so disposed in relation to the rod ends that the further a rod projects from the wheel or chain the greater is the movement given to them. By appropriate means the variations in the distance of movement of the knives or equivalent members are conveyed to the means for controlling or varying the drafting action.

The knives or equivalent members may differ in shape so that the time of their movement by the rods will vary. In this way delay in the effect of feeler indications can be correlated to the amplitude or rate of change of amplitude of such indications in any manner desired.

Two or more transmitting devices may be provided at different points around the periphery of the setter wheel or in the travel of the chain, and one of such transmitters may be so located as to control with a certain delay one feature of the drafting means such as speed, while another or others may control with the same or with different delay or delays another or other features.

Figure 2:
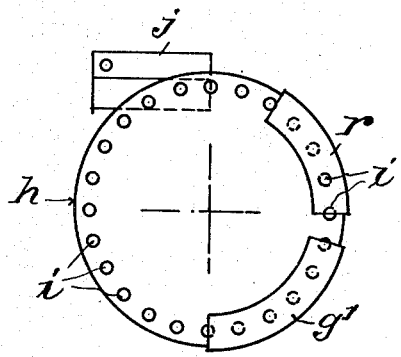

In the accompanying drawing, I have illustrated, diagrammatically, in Fig. 1, an arrangement or combination of mechanisms for carrying out the invention as applied to the detection and correction of variations in the thickness or diameter of a textile sliver, in which term there is intended to be included a bunch or plurality of separate slivers;

Fig. 2 is an end view of a portion of the mechanism shown in Fig. 1.

Referring to the drawing, a represents a suitably driven grooved wheel into the groove of which the sliver b, assumed to be travelling in the direction of the arrow c, is yieldingly pressed by a rotatable wheel d. The pressure of wheel d may be obtained by weight or spring action, preferably adjustable.

By means of a magnifying lever e pivoted at e' any movements of wheel d away from or towards grooved wheel a, due to a variation in the thickness or diameter of the travelling sliver, are transmitted, if desired, through a suitable form of a relay indicated at f, to a yoke member g, the arms g', g², of which straddle the lower part of what I term a controlling relay. This comprises, in the example illustrated, a suitably rotated wheel or disc h through openings in which, parallel to the axis of rotation of the wheel, there extend a series of circumferentially-spaced rods i. These rods are caused, by the action of the yoke member g in accordance with the indications of the feeler wheel d, to slide in one or the other direction through the wheel h and thus to cause their ends to project either a greater or a smaller distance from the wheel. As, in the rotation of the wheel h, the rods i are carried upwardly the ends of the rods in the right side of wheel h bear against a "transmitter" j movable in a vertical plane and having a suitably inclined or curved under surface j'. As is evident from Fig. 1, the control surface j' makes an angle of approximately 20° with each rod i during engagement therewith. As will be understood, the further the rods i project under the surface j' the greater will be the distance through which the transmitter is moved in a vertical plane, and vice versa. The vertical movements of the transmitter are arranged to be transmitted, if desirable through a suitable form of construction of relay k, to a variable speed gear indicated at m, and capable of controlling the relative speeds of rotation of two pairs of driven rollers n, n', and p, p', between which a drafting action is exerted on the sliver. Additional rollers, fallers, push bars, aprons, porcupines or other devices employed in connection with the drafting of slivers may be interposed between the two pairs of drafting rollers. The drafting action exerted on the sliver is, by the means set forth, always made proportional to the thickness of the sliver passing into the drafting zone.

The speed of the rod wheel h, and the circumferential distance between the point at which the yoke member acts upon the rods i in the event of any variation from standard in the diameter or thickness of the sliver, are so correlated that the lapse of time between the setting of the rods, as a result of a variation from standard, and the transmission of the effect of such setting to the means for varying the drafting action on the sliver, enables the point on the sliver from which the indication was received to travel from the measuring or feeling position to the point in the drafting zone at which the corrective action is required to take place.

The rods i after passing the transmitter j are returned to initial position by suitably disposed plates r.

As is apparent from Fig. 1, the transmitter j engages each rod i with a component of force directed toward the axis of wheel h which is substantially greater than the component of force parallel to the axis of wheel h, so that the rods have no tendency to slide with respect to wheel h while engaging the control surface j' of transmitter j.

The feeler mechanism may be located closely adjacent to the drafting zone, or be actually incorporated with the drafting means. In some cases the controlling relay and transmitter can, if found practicable, be dispensed with and the feeler mechanism operates directly, or if necessary through a suitable relay, a change-speed mechanism for varying the drafting action.

The transmitter may have a fixed pre-shaped under surface or may comprise a series of knives, thin plates or equivalent members capable of being set by means of an adjustable template, to enable the shape or contour of the surface against which the rods i act to be adjusted as desired.

It will be understood that the specific mechanism I have described and illustrated for detecting variations from standard in the thickness or diameter of a sliver, and for enabling the indications of the detecting mechanism to be utilised to vary the action of means for drafting the sliver, are only given by way of example and can be varied in many ways both as to construction and arrangement.

Having thus fully described my invention, what I claim as new and desire to secure by Letters Patent is:

1. Apparatus for automatically adjusting an adjustable operating means of a machine in accordance with variations in the thickness of the material to be acted on by the operating means, comprising in combination, recording means for recording the thickness variations in the material to be acted on by the operating means, said recording means comprising a rotatably mounted driven wheel and a plurality of substantially identical rods slidably mounted on said driven wheel along the peripheral portion thereof for linear movement substantially parallel to the axis of rotation of said driven wheel; means for shifting said rods on said wheel in correspondence to variations in the thickness of the material acted on; and transmission means engaging said recording means and the adjustable operating means for adjusting the latter in response to the thickness variations recorded by said recording means, said transmission means comprising a transmitter mounted for movement in a direction substantially perpendicular to said axis and having a control surface located adjacent to said wheel in the path of movement of said rods so as to be moved thereby upon rotation of said wheel.

2. In an apparatus for automatically adjusting a machine in accordance with variations in the thickness of the material acted on by the machine, in combination, a wheel mounted for rotation about its axis and being formed adjacent its periphery with a plurality of bores parallel to said axis, extending through said wheel, and being distributed about said axis; a plurality of rods having a length greater than the thickness of said wheel and respectively extending slidably through said bores of said wheel; means for shifting said rods in said bores of said wheel in accordance with variations in the thickness of the material acted on by the machine, said shifting means including a yoke having a pair of arms located on opposite sides of said wheel for engaging said rods to shift the same; and a transmitter for actuating an adjusting mechanism of the machine in accordance with the positions of said rods of said wheel, said transmitter being mounted for movement along a line substantially perpendicular to the axis of rotation of said wheel and having a control surface successively engaged by said rods during rotation of said wheel, said control surface overlapping a substantial portion of each rod during engagement therewith.

3. In an apparatus for automatically adjusting a machine in accordance with variations in the thickness of the material acted on by the machine, in combination, a wheel mounted for rotation about its axis and being formed adjacent its periphery with a plurality of bores parallel to said axis, extending through said wheel, and being distributed about said axis; a plurality of rods having a length greater than the thickness of said wheel and respectively extending slidably through said bores of said wheel; means for shifting said rods in said bores of said wheel in accordance with variations in the thickness of the material acted on by the machine, said shifting means including a yoke having a pair of arms located on opposite sides of said wheel for engaging said rods to shift the same; and a transmitter for actuating an adjusting mechanism of the machine in accordance with the positions of said rods of said wheel, said transmitter being mounted for movement along a line substantially perpendicular to the axis of rotation of said wheel and having a control surface successively engaged by said rods during rotation of said wheel, said control surface overlapping a substantial portion of each rod during engagement therewith and making an angle of approximately 20° with each rod during engagement therewith.

4. In an apparatus for automatically adjusting a machine in accordance with variations in the thickness of the material acted on by the machine, in combination, a wheel mounted for rotation about its axis and being formed adjacent its periphery with a plurality of bores parallel to said axis, extending through said wheel, and being distributed about said axis; a plurality of rods having a length greater than the thickness of said wheel and respectively extending slidably through said bores of said wheel; means for shifting said rods in said bores of said wheel in accordance with variations in the thickness of the material acted on by the machine, said shifting means including a yoke having a pair of arms located on opposite sides of said wheel for engaging said rods to shift the same; a transmitter for actuating an adjusting mechanism of the machine in accordance with the positions of said rods of said wheel, said transmitter being mounted for movement along a line substantially perpendicular to the axis of rotation of said wheel and having a control surface successively engaged by said rods during rotation of said wheel, said control surface overlapping a substantial portion of each rod during engagement therewith; and means for restoring said rods to a central position on said wheel after said rods leave said control surface.

5. Apparatus for automatically adjusting an adjustable operating means of a machine in accordance with variations in the thickness of the material to be acted on by the operating means, comprising in combination, recording means for recording the thickness variations in the material to be acted on, said recording means comprising a rotatably mounted driven wheel and a plurality of substantially identical rods slidably mounted on said driven wheel along the peripheral portion thereof for linear movement substantially parallel to the axis of rotation of said driven wheel; means for shifting said rods on said wheel in correspondence to thickness variations of the material to be acted on by the operating means; and transmission means engaging said recording means and the adjustable operating means for adjusting the latter in response to the thickness variations recorded by said recording means, said transmission means comprising a single transmitter located adjacent to said wheel on only one side thereof, mounted for movement along a line substantially perpendicular to said axis, and said transmitter having a control surface located in the path of movement of said rods so as to be moved thereby upon rotation of said wheel, said control surface being inclined to the axis of rotation of said wheel, overlapping a substantial portion of each rod during engagement therewith, and engaging each rod with a component of force directed toward said axis which is substantially greater than the component of force parallel to said axis, so that said rods have no tendency to slide with respect to said wheel during engagement with said control surface.

6. Apparatus for automatically adjusting an adjustable operating means of a machine in accordance with variations in the thickness of the material to be acted on by the operating means, comprising in combination, recording means for recording thickness variations of the material to be acted on, said recording means comprising a rotatably mounted driven wheel and a plurality of substantially identical rods slidably mounted on said driven wheel along the peripheral portion thereof for linear movement substantially parallel to the axis of rotation of said driven wheel; means for shifting said rods on said wheel in correspondence to thickness variations of the material to be acted on by the operating means; and transmission means engaging said recording means and the adjustable operating means for adjusting the latter in response to the thickness variations recorded by said recording means, said transmission means comprising a single transmitter located adjacent to said wheel on only one side thereof, being mounted for movement along a straight line perpendicular to said axis, and having a control surface located in the path of movement of said rods so as to be moved thereby upon rotation of said wheel, so that said control surface can be contacted by only one end of each of said rods.

7. Apparatus for automatically adjusting an adjustable operating means of a machine in accordance with variations in the thickness of the material to be acted on by the operating means, comprising in combination, detecting means for detecting variations in the size of the material acted on, said detecting means comprising a moving member whose magnitude of movement is directly proportional to the magnitude of thickness variations detected; recording means engaging said detecting means for recording the thickness variations detected by said detecting means, said recording means comprising a rotatably mounted driven wheel and a plurality of substantially identical rods slidably mounted on said driven wheel along the peripheral portion thereof for linear movement substantially parallel to the axis of rotation of said driven wheel, said driven wheel being located adjacent to said moving member and the path of movement of said rods intersecting said moving member so that the latter moves said rods by distances directly proportional to the thickness variations detected by said detecting means; and transmission means engaging said recording means and the adjustable operating means for adjusting the latter in response to the thickness variations recorded by said recording means, said transmission means comprising a transmitter mounted for movement along a straight line perpendicular to said axis and said transmitter having a control surface located adjacent to said wheel in the path of movement of said rods so as to be moved thereby upon rotation of said wheel, said control surface being inclined to the axis of rotation of said wheel and engaging each rod with a component of force directed toward said axis which is substantially greater than a component of force parallel to said axis so that said rods will have no tendency to slide with respect to said wheel while engaging said control surface.

References Cited in the file of this patent

UNITED STATES PATENTS

| Number | Name | Date |
|---|---|---|
| Re. 12,478 | Westcott et al. | May 8, 1906 |
| 884,442 | Westcott et al. | Apr. 14, 1908 |
| 1,132,316 | Eves | Mar. 16, 1915 |